B. G. H. HATHAWAY.
Grain Separator.
No. 5,659.
2 Sheets—Sheet 2.
Patented July 5, 1848.
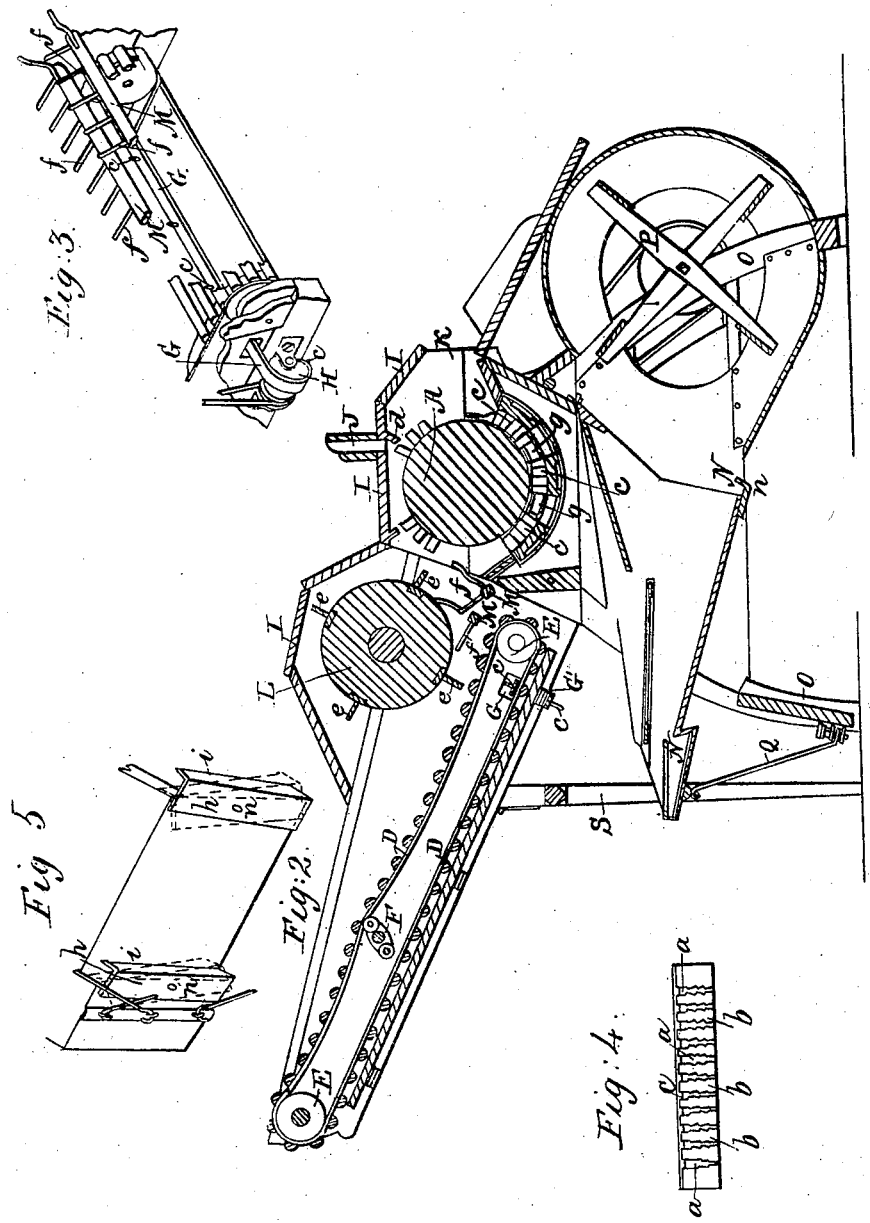

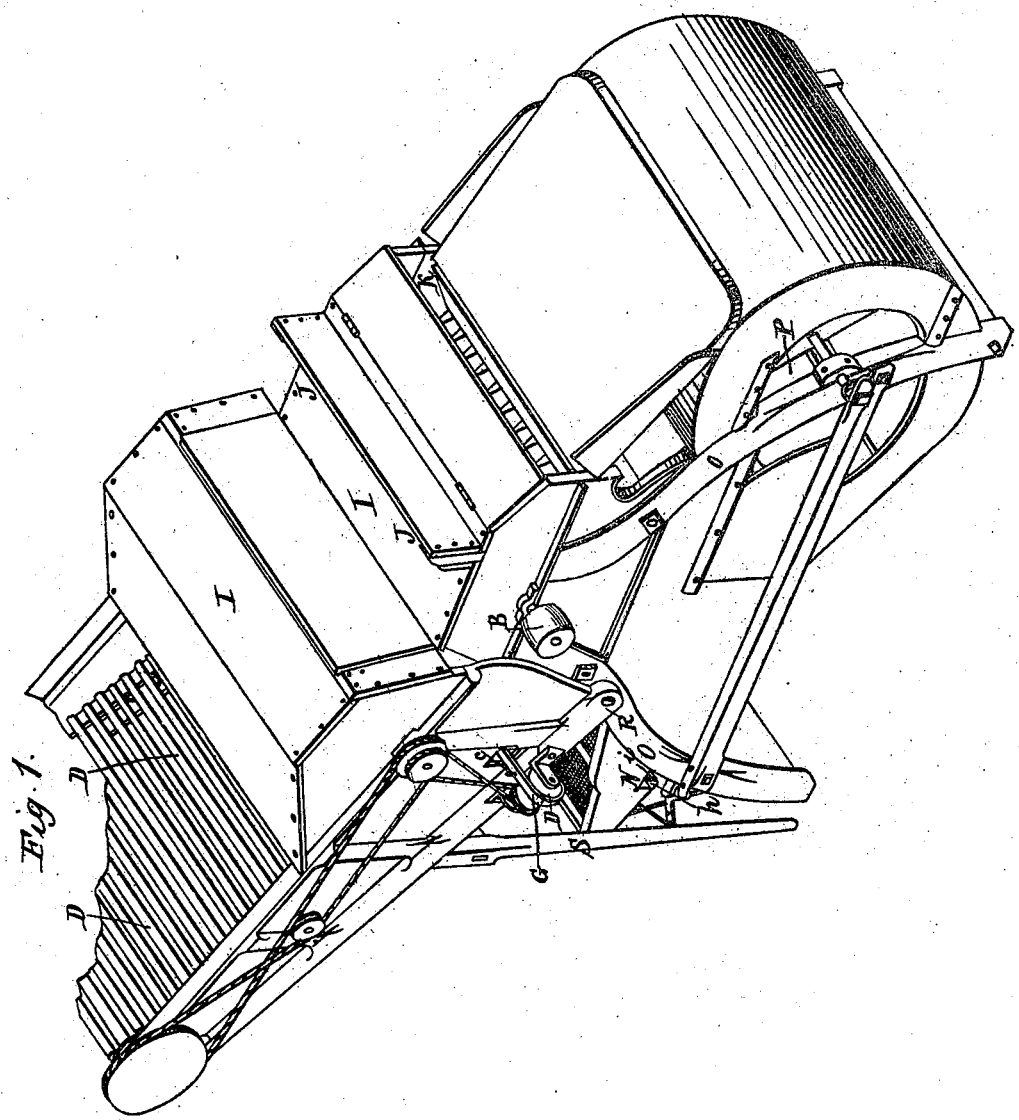

UNITED STATES PATENT OFFICE.

B. G. H. HATHAWAY, OF ROCK STREAM, NEW YORK.

MACHINE FOR THRESHING AND CLEANING GRAIN.

Specification of Letters Patent No. 5,659, dated July 5, 1848.

*To all whom it may concern:*

Be it known that I, BRADFORD G. H. HATHAWAY, of Rock Stream, in the county of Yates and State of New York, have invented certain new and useful Improvements in the Manner of Constructing Machines for the Threshing, Separating, and Cleaning of Grain; and I do hereby declare that the following is a full and exact description thereof.

In the general arrangement of its respective parts my machine is similar to others which have been constructed for a like purpose; but I have made several particular improvements therein which renders it more convenient and efficient in its action than those at present in use.

In the accompanying drawing Figure 1, is a perspective representation of my machine; Fig. 2, a longitudinal vertical section thereof, from front to back through its middle; Figs. 3 and 4 show parts in detail which will be presently explained.

In each of the figures where the same parts are represented they are designated by the same letters of reference.

A is the threshing cylinder, to the pulley B on the axis of which the driving power may be applied. This cylinder is furnished with teeth which have not anything peculiar in their formation, but I employ a concave the teeth of which are so formed as to cause them to separate the grain, or seed, from the hull in the most perfect manner, whether the kind of grain, or seeds be large or small.

In Fig. 4, I have given a face view C, of a segment of the concave; *a, a, a* are teeth having successive offsets, or angular points, at their sides, which increase successively in width, and as the teeth of the concave pass through the spaces *b, b, b,* between them, serve to separate the grain, or seed from the hull. In the section, Fig. 2, there are shown at C, C, C, three of these segment plates; but this number may be varied, but not, as I believe, with advantage. They may be cast with the rows of teeth, on solid plates as represented, or the teeth may be made of wrought iron and be driven into strips of wood; between each of the segments constituting the concave there are plates of metal, *g, g,* which are to be perforated with holes that will allow a passage to the seed, and to air; the spaces over these plates allow of the turning over of the seeds and the more effectual separation of the hulls, or chaff from them.

D, D, is an endless apron of slats attached at their ends to bands of leather or other material, and passing around rollers E E. A revolving shaker F, one of which is to be situated between each of the bands serves to agitate, or shake, the endless apron; these shakers are furnished with friction rollers to prevent abrasion; there is not anything new in this endless apron, but I have devised a plan for the effectual removal of an inconvenience to which such endless aprons are ordinarily subjected, namely, to the accumulation of a quantity of straw at the lower part thereof, between the rows of slats, in consequence of the constant falling in of a portion, principally short pieces, between the upper slats. The device for this purpose is most distinctly shown in Fig. 3. G G, is a strap, or belt that passes around guide rollers H, on either side of the machine; the strap passes between the upper and lower portions of the endless apron, is furnished with teeth *c, c,* that lay hold on the accumulating straw, and carry it out on the side of the machine. The strap G, may, if preferred, have its flat sides vertical, instead of horizontal, and be contained entirely between the two portions of the apron.

In the cover I, I, which incloses the threshing cylinder, and other parts of the apparatus, I form a spout, or opening J, extending from side to side of the machine for the escape of the dust produced by the threshing, which in the ordinary machine escapes through the feed opening at K, in front of the machine, to the great annoyance of the persons engaged in the feeding; to cause the dust to pass the more effectually through the spout, a ledge *d*, is extended along the under side of the cover.

L, is a revolving roller, or rake, carrying teeth *e, e,* that serve to pass the straw from the threshing cylinder on to the endless apron.

M, M, are bars, or shafts, that cross the machine in the position represented, and that are capable of being turned around and held in different positions, so as to offer a greater, or less resistance to the passing of the straw &c. from the threshing cylinder to the rake cylinder. When the stalks, or straw, are damp, they should pass onward much less freely than when dry; the bars M M have each a row of teeth *f f* in them pointed forward through which the straw passes and these operate therefore, very beneficially in this particular, as they may be placed in a position adapted to the particular state of the stalks, and cause them to be acted on for a longer or shorter period of time.

There is a great convenience in being able to throw the heads and other trash, and also the grain or seed, off on either side of the machine at will, and this I effect by means of tilting spouts, one situated at the upper, and one at the lower part of the shaker, the former for the trash, the latter for the grain; these spouts are made to vibrate on a pin (*n* see Fig. 4) at their centers so that their inclination can be changed instantaneously they extend across from one side to the other and their inclination is changed when a quantity has accumulated on one side which it is desirable to remove so as to throw it onto the other side, they are held by their weight. N Fig. 1, shows the opening of one tilting spout, which consists simply of a plate of metal *h*, turned up on its edge *i*, extending from side to side of the shaker, and turning on a pivot *n*, at its center under the bottom of said shaker; this is clearly shown in Fig. 4, when the spouts are in one position and the red lines indicate their opposite position.

In the general construction of the fanning mill that makes a part of this machine, there is not anything peculiar, but I have framed the whole together in such a manner as to render it very convenient and manageable. *o, o*, which constitute the legs of the thresher are also those of the fanning and cleansing apparatus. To the fore legs are attached the bearings of the axle of the fan wheel P. The shaker irons, or rods *a*, Fig. 2, are attached to the hind legs. By placing the jointed rods *s*, below the shaker, instead of suspending it in the usual manner, the upper part of the machine is not only left unobstructed, but the kind of vibration thereby given is found to produce a much better effect than by suspension.

The straw carrier and its appendages are attached to the threshing and fanning portion of the machine by hinges, or joint pins, as at R, and may be readily removed therefrom at will. This part is supported by hinged legs S, that enable the elevation of the carrier to be changed at will; a change very desirable in regulating the machine.

Having thus fully described the manner in which I construct my machine, and pointed out the operation of the respective parts thereof, what I claim therein as new, and desire to secure by Letters Patent, is—

1. The particular manner of forming the teeth of the concave, with offsets, as represented, the respective plates, or pieces of wood, forming the basis of these teeth, having spaces between them, as shown at *g, g*, for the purpose set forth.

2. I claim the manner set forth of using the strap, or belt, G, G, for carrying off the waste straw from between the upper and lower portions of the endless apron.

3. I claim the employment of the shafts M, M, furnished with teeth *f, f*, in the manner and for the purpose set forth.

4. I claim the manner of employing the tilting spouts, N, in a grain cleansing machine, for the purpose of delivering the material from the shaking screens on either side of the machine.

B. G. H. HATHAWAY.

Witnesses:
   Thos. P. Jones,
   Leml. Williams.